United States Patent
Gutierrez et al.

(10) Patent No.: US 10,378,480 B2
(45) Date of Patent: Aug. 13, 2019

(54) BLOCKER DOOR STIFFENING FEATURES (71) Applicant: Rohr, Inc., Chula Vista, CA (US)

(72) Inventors: Adrian A Gutierrez, Chula Vista, CA (US); Isaac N Wanjohi, San Diego, CA (US)

(73) Assignee: Rohr, Inc, Chula Vista, CA (US)

( * ) Notice: Subject to any disclaimer, the term of this patent is extended or adjusted under 35 U.S.C. 154(b) by 356 days.

(21) Appl. No.: 15/430,036

(22) Filed: Feb. 10, 2017

(65) Prior Publication Data
US 2018/0230941 A1    Aug. 16, 2018

(51) Int. Cl.
*F02K 1/72* (2006.01)
*F02K 1/62* (2006.01)

(52) U.S. Cl.
CPC .............. *F02K 1/72* (2013.01); *F02K 1/62* (2013.01); *F02K 1/625* (2013.01); *F05D 2220/323* (2013.01); *F05D 2240/12* (2013.01)

(58) Field of Classification Search
CPC ... F02K 1/62; F02K 1/625; F02K 1/70; F02K 1/72
See application file for complete search history.

(56) References Cited

U.S. PATENT DOCUMENTS

| 3,262,268 A | * | 7/1966 | Beavers | ............... F02K 1/72 |
| | | | | 239/265.19 |
| 3,691,771 A | | 9/1972 | Colley | |
| 2016/0326985 A1 | * | 11/2016 | Hercock | ............... F02K 1/625 |

FOREIGN PATENT DOCUMENTS

EP    3128163    2/2017

OTHER PUBLICATIONS

European Patent Office, European Search Report dated Jun. 26, 2018 in Application No. 18155881.8-1007.

* cited by examiner

*Primary Examiner* — Andrew H Nguyen
(74) *Attorney, Agent, or Firm* — Snell & Wilmer, L.L.P.

(57) ABSTRACT

A thrust reverser blocker door may comprise a proximal surface, a distal surface located opposite the proximal surface, a first attachment feature extending from the distal surface, a second attachment feature extending from the distal surface, a drag link housing extending from the distal surface, a first diagonal stiffener extending from the distal surface and extending between the first attachment feature and the drag link housing, a second diagonal stiffener extending from the distal surface and extending between the second attachment feature and the drag link housing, a first perimetrical stiffener extending from the distal surface and extending from the first attachment feature and the drag link housing, a second perimetrical stiffener extending from the distal surface and extending from the second attachment feature and the drag link housing, and a middle stiffener extending between the first attachment feature and the second attachment feature.

15 Claims, 8 Drawing Sheets

BLOCKER DOOR STIFFENING FEATURES

FIELD

This disclosure relates generally to gas turbine engines, and more particularly to stiffening features for thrust reverser blocker doors for thrust reverser assemblies.

BACKGROUND

A thrust reverser blocker door may move to a deployed position, blocking fan duct air and causing reverse thrust. A pressure of the fan duct air may act on the blocker door in response to the blocker door moving to the deployed position. The blocker door may be subjected to torsional loading by the fan duct air.

SUMMARY

A thrust reverser blocker door is disclosed herein, in accordance with various embodiments. A thrust reverser blocker door may comprise a proximal surface extending in a lengthwise direction between a forward edge and an aft edge and extending in a widthwise direction between a first side edge and a second side edge, a distal surface located opposite the proximal surface and extending between the forward edge and the aft edge and extending between the first side edge and the second side edge, a first attachment feature extending from the distal surface, a second attachment feature extending from the distal surface, a drag link housing extending from the distal surface, a first diagonal stiffener extending from the distal surface and extending between the first attachment feature and the drag link housing, a second diagonal stiffener extending from the distal surface and extending between the second attachment feature and the drag link housing, a first perimetrical stiffener extending from the distal surface and extending from the first attachment feature and the drag link housing, and a second perimetrical stiffener extending from the distal surface and extending from the second attachment feature and the drag link housing.

In various embodiments, the thrust reverser blocker door may further comprise a middle stiffener extending in the widthwise direction between the first attachment feature and the second attachment feature, and a first forward stiffener disposed forward of the first attachment feature and the second attachment feature and extending in the widthwise direction between the first side edge and the second side edge. The thrust reverser blocker door may further comprise a second forward stiffener extending in the lengthwise direction between the first attachment feature and the forward edge, and a third forward stiffener extending in the lengthwise direction between the second attachment feature and the forward edge. The thrust reverser blocker door may further comprise a first platform extending from the distal surface, the first attachment feature extending from the first platform, and a second platform extending from the distal surface, the second attachment feature extending from the second platform. The first diagonal stiffener may transfer a load between the drag link housing and the first attachment feature in response to the blocker door being deployed and the second diagonal stiffener may transfer the load between the drag link housing and the second attachment feature in response to the blocker door being deployed. The blocker door, the first diagonal stiffener, the second diagonal stiffener, the first perimetrical stiffener, the second perimetrical stiffener, the middle stiffener, the drag link housing, the first attachment feature and the second attachment feature may comprise a single unitary member. At least one of the first diagonal stiffener, the second diagonal stiffener, the first perimetrical stiffener, the second perimetrical stiffener, and the middle stiffener may comprise an elongated boss extending from the distal surface. The blocker door, the first diagonal stiffener, the second diagonal stiffener, the first perimetrical stiffener, the second perimetrical stiffener, the middle stiffener, the drag link housing, the first attachment feature and the second attachment feature comprise aluminum. A grain direction of the blocker door may be in the widthwise direction. The thrust reverser blocker door may further comprise a second middle stiffener extending in the lengthwise direction between the first forward stiffener and the first middle stiffener.

A thrust reverser is disclosed herein, in accordance with various embodiments. A thrust reverser may comprise an inner fixed structure (IFS), a cascade disposed radially outward from the IFS, a plurality of blocker doors disposed between the IFS and the cascade, and a plurality of drag links coupled between the plurality of blocker doors and the IFS, wherein the plurality of blocker doors includes at least a first blocker door and a second blocker door. The first blocker door comprises a proximal surface extending in a lengthwise direction between a forward edge and an aft edge and extending in a widthwise direction between a first side edge and a second side edge, a distal surface located opposite the proximal surface and extending between the forward edge and the aft edge and extending between the first side edge and the second side edge, a first attachment feature extending from the distal surface, a second attachment feature extending from the distal surface, a drag link housing extending from the distal surface, a first diagonal stiffener extending from the distal surface and extending between the first attachment feature and the drag link housing, a second diagonal stiffener extending from the distal surface and extending between the second attachment feature and the drag link housing, a first perimetrical stiffener extending from the distal surface and extending from the first attachment feature and the drag link housing, and a second perimetrical stiffener extending from the distal surface and extending from the second attachment feature and the drag link housing.

In various embodiments, the first blocker door may further comprise a first middle stiffener extending in the widthwise direction between the first attachment feature and the second attachment feature, and a first forward stiffener disposed forward of the first attachment feature and the second attachment feature and extending in the widthwise direction between the first side edge and the second side edge. The first blocker door may further comprise a second forward stiffener extending in the lengthwise direction between the first attachment feature and the forward edge, and a third forward stiffener extending in the lengthwise direction between the second attachment feature and the forward edge. The first blocker door may further comprise a first platform extending from the distal surface, the first attachment feature extending from the first platform, and a second platform extending from the distal surface, the second attachment feature extending from the second platform. The first diagonal stiffener may transfer a load between the drag link housing and the first attachment feature in response to the first blocker door being deployed and the second diagonal stiffener may transfer the load between the drag link housing and the second attachment feature in response to the first blocker door being deployed. The first blocker door, the first diagonal stiffener, the second diagonal stiffener, the first perimetrical stiffener, the second perimetrical stiffener, the first middle stiffener, the drag link housing, the first attachment feature and the second attachment feature may comprise a single unitary member. The first blocker door may further comprise a second middle stiffener extending in the lengthwise direction between the first forward stiffener and the first middle stiffener.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 4A:
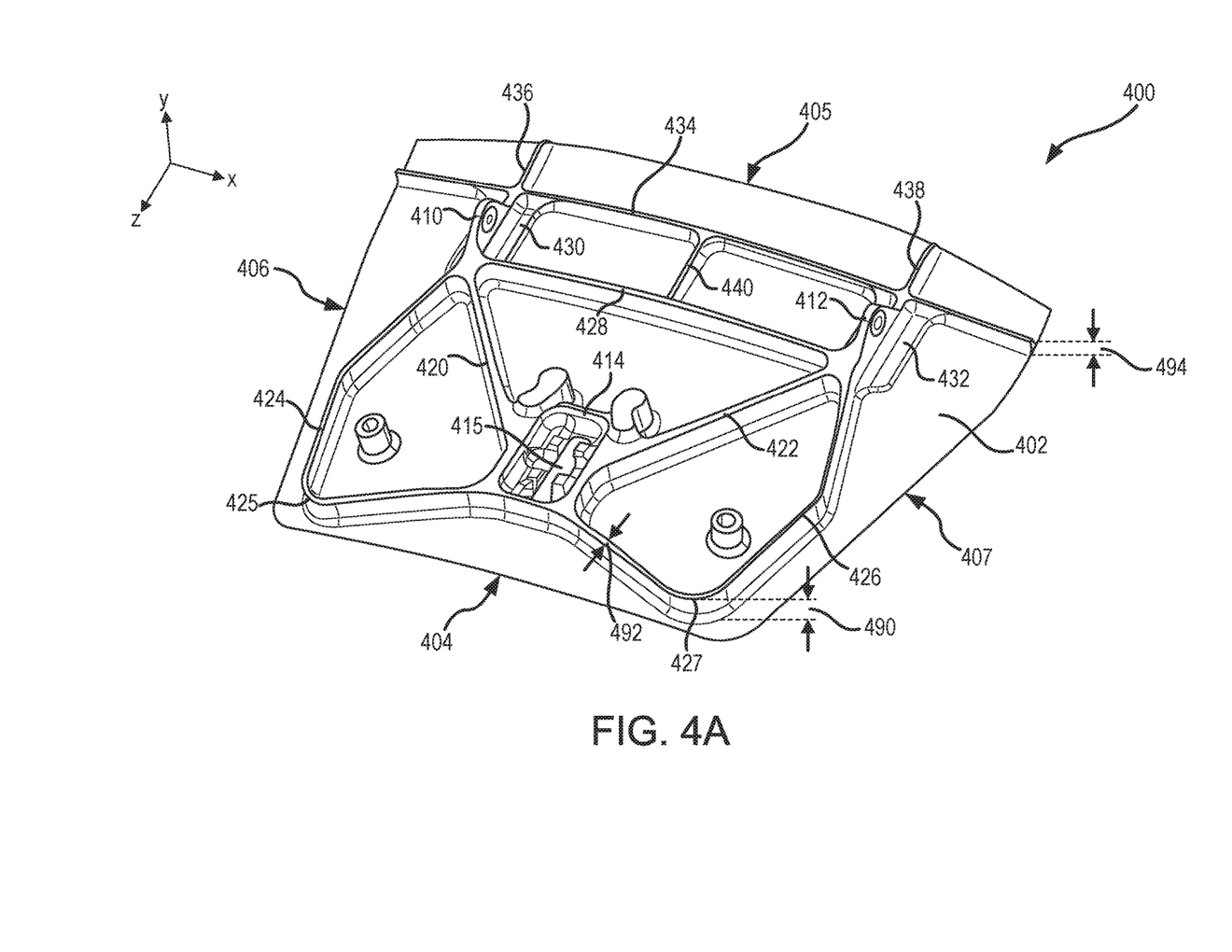
FIG. 4A illustrates a perspective view of a distal surface of a thrust reverser blocker door having stiffening features, in accordance with various embodiments.
Figure 4B:
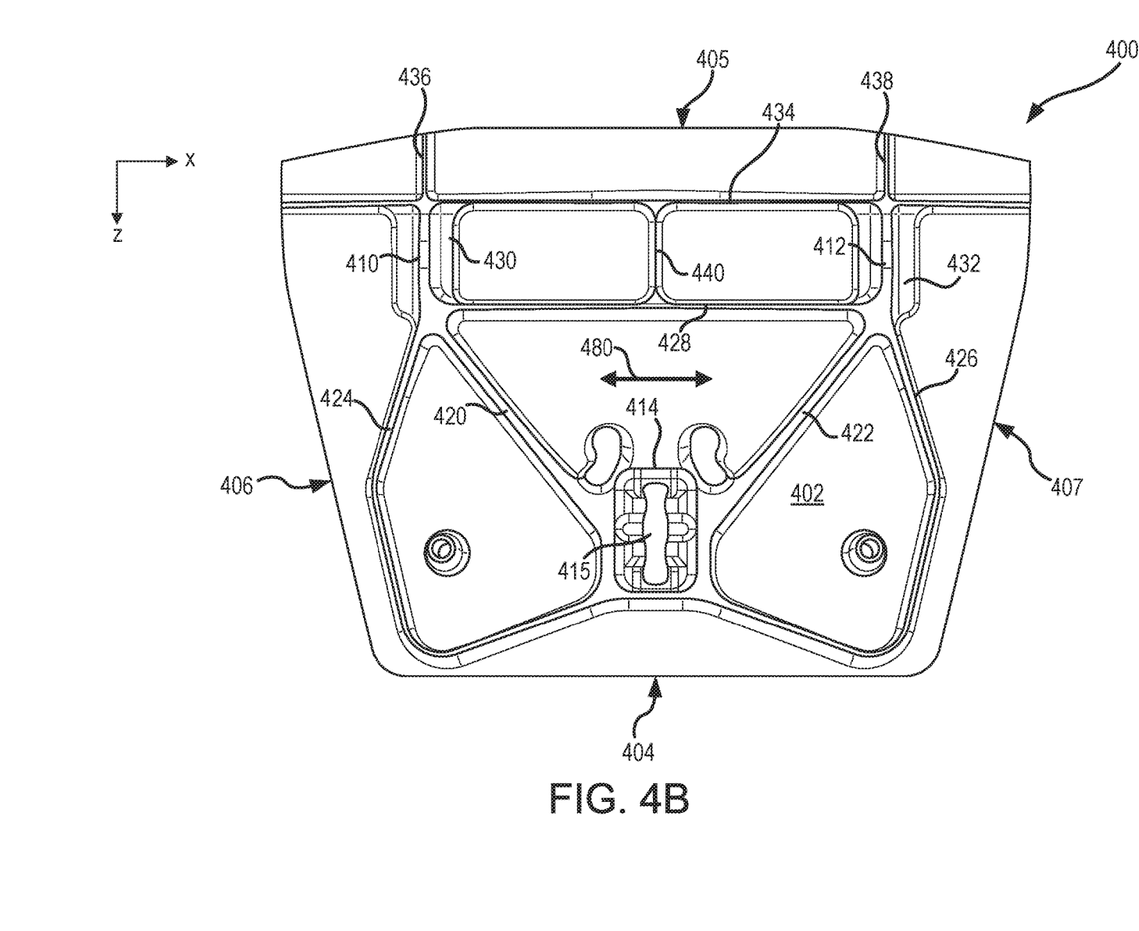
FIG. 4B illustrates a distal view of the thrust reverser blocker door of FIG. 4A, in accordance with various embodiments.

With respect to FIG. 4B, elements with like element numbering, as depicted in FIG. 4A, are intended to be the same and will not necessarily be repeated for the sake of clarity.

Figure 1:
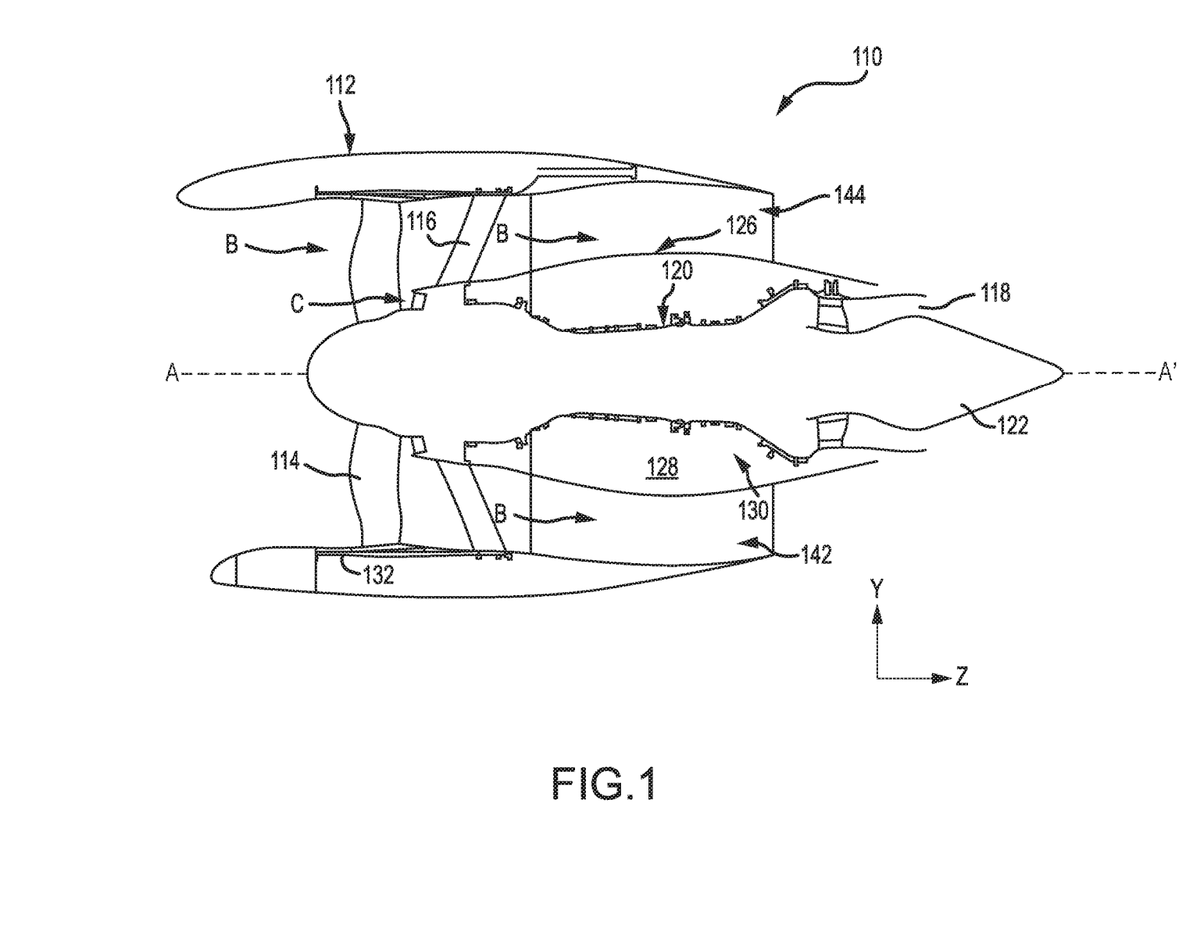
FIG. 1 illustrates a gas turbine engine, in accordance with various embodiments.

FIG. 1 illustrates a schematic view of a gas turbine engine, in accordance with various embodiments. Xyz-axes are provided for ease of illustration. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112. Fan 114 may rotate about an engine centerline axis A-A'.

Nacelle 112 typically comprises two halves which are typically mounted to a pylon. According to various embodiments, multiple guide vanes 116 may extend radially between core engine 120 and fan case 132. Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or compressed air ducts, for example.

Figure 2A:
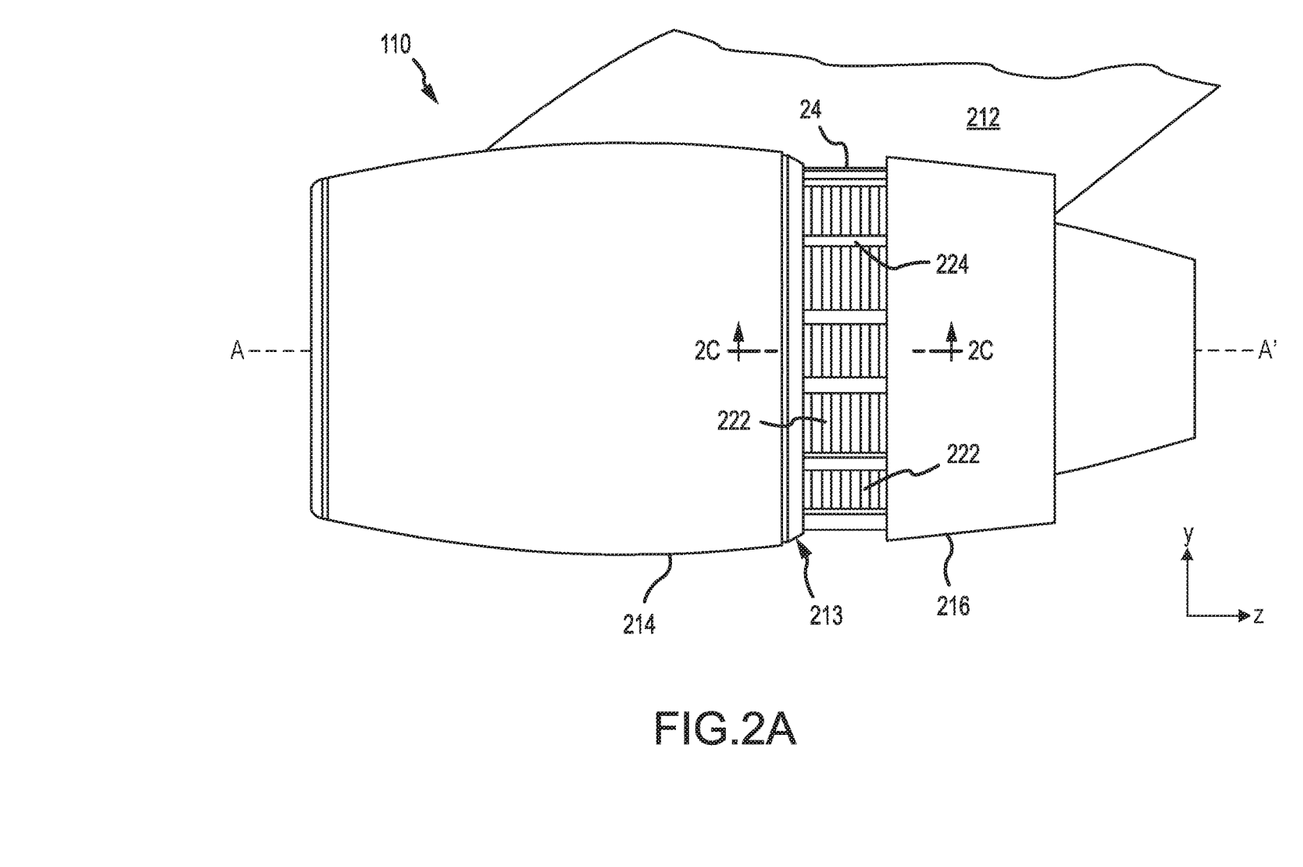
FIG. 2A illustrates a side view of a gas turbine engine, in accordance with various embodiments.

With reference to FIG. 2A, a side view of gas turbine engine 110 is illustrated, in accordance with various embodiments. Gas turbine engine 110 may comprise a turbofan engine. Gas turbine engine 110 may be mounted onto an aircraft by pylon 212. Gas turbine engine 110 may include segmented cowl 213 which includes nacelle body 214 and translating cowl 216 and IFS 126 (with momentary reference to FIG. 1). Translating cowl 216 is split from nacelle body 214 and translates aft to produce reverse thrust.

A plurality of cascade vane sets 222 may be uncovered in response to translating cowl 216 being translated aft as seen in FIG. 2A. Each of cascade vane sets 222 may include a plurality of conventional transverse, curved, turning vanes which turn airflow passing out from bypass flow path B (see FIG. 1) through the cascade sets in an outwardly and forwardly direction relative to gas turbine engine 110. Islands 224 are provided between cascade vane sets 222 to support the translation of translating cowl 216 and support the sides of cascade vane sets 222. In the stowed position, translating cowl 216 is translated forwardly to cover cascade vane sets 222 and provide a smooth, streamlined surface for air flow during normal flight operations.

Figure 2B:
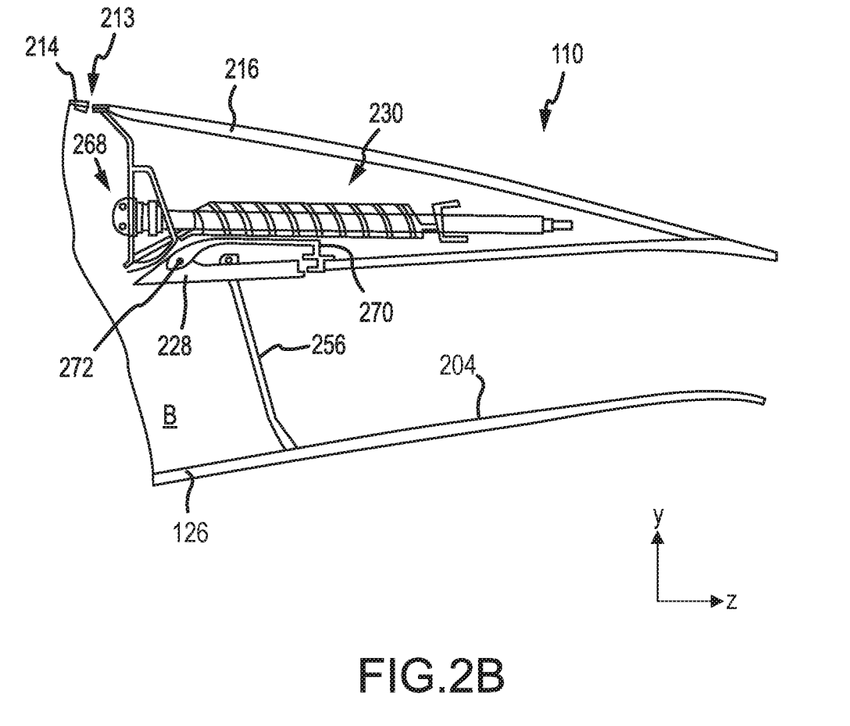
FIG. 2B illustrates a cross-section view of gas turbine engine with a blocker door in a stowed position, in accordance with various embodiments.

With reference to FIG. 2B, a cross-section view of gas turbine engine 110 with blocker door 228 in a stowed position is illustrated, in accordance with various embodiments. Cascade 230 shown in FIG. 2B is just one of many cascade vane sets 222 disposed circumferentially around gas turbine engine 110 as shown in FIG. 2A. An actuator 268 may be disposed between these sets of cascades in order to drive translating cowl 216 aftward. After a thrust reversing operation is completed, actuators 268 may return blocker door 228 to the stowed position. Actuator 268 can be a ball-screw actuator, hydraulic actuator, or any other actuator known in the art. In various embodiments, multiple actuators 268 may be spaced around gas turbine engine 110 in between cascade vane sets 222. Although illustrated in FIG. 2B and FIG. 2C as being radially in-line with cascade 230, actuator 268 may be located radially inward, radially outward, or in any location relative to cascade 230.

Blocker door (also referred to herein as thrust reverser blocker door) 228 may be engaged with translating cowl 216. In various embodiments, blocker door 228 may be engaged with translating cowl 216 through bracket 270. In various embodiments, bracket 270 and translating cowl 216 may comprise a single, unitary member. Pivot 272 may be a hinge attachment between blocker door 228 and bracket 270. In various embodiments, blocker door 228 may be engaged directly to translating cowl 216 through a hinge attachment. Pivot 272 may allow blocker door 228 to rotate as translating cowl 216 moves from a stowed position to a deployed position.

Figure 2C:
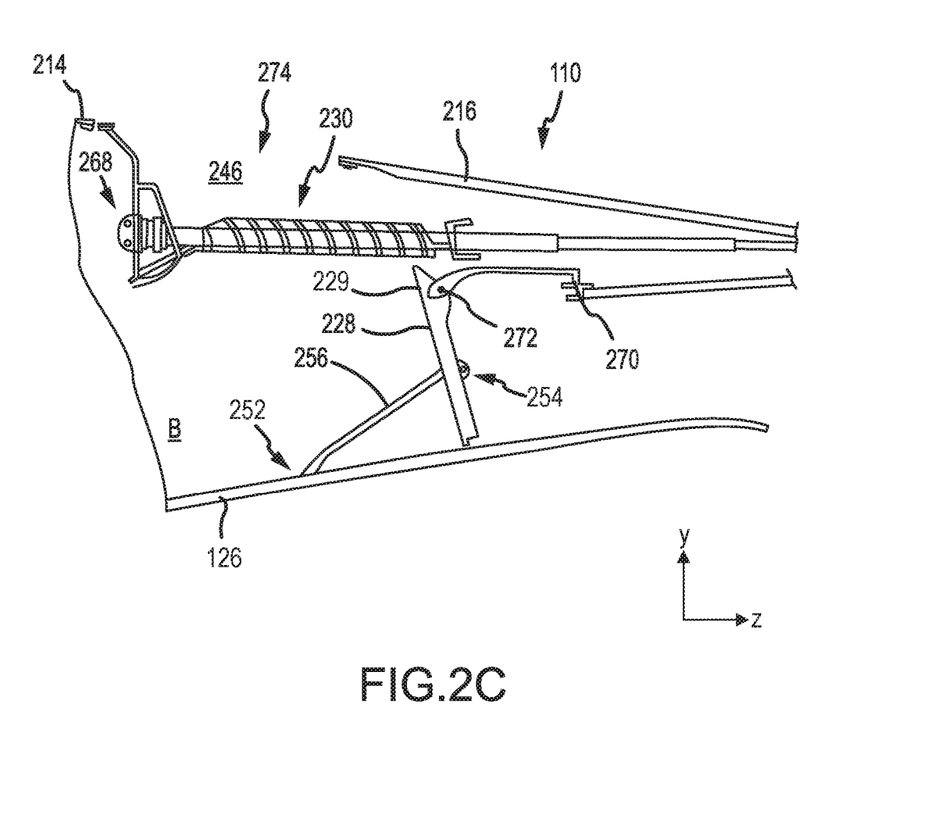
FIG. 2C illustrates a cross-section view of gas turbine engine with a blocker door in a deployed position, in accordance with various embodiments.

With combined reference to FIG. 2B and FIG. 2C, a drag link 256 may be coupled between blocker door 228 and IFS 126. Drag link 256 may be configured to pivot about a first end 252. Stated another way, first end 252 of drag link 256 may be rotatably coupled to IFS 126. Second end 254 of drag link 256 may be rotatably coupled to blocker door 228.

With respect to FIG. 2C, elements with like element numbering, as depicted in FIG. 2B, are intended to be the same and will not necessarily be repeated for the sake of clarity.

With reference to FIG. 2C, a cross-section view of gas turbine engine 110 with blocker door 228 in a deployed position is illustrated, in accordance with various embodiments. Thus, FIG. 2C shows gas turbine engine 110 in a reverse thrust mode. Blocker door 228 and its associated linkage system are responsive to translation of translating cowl 216 during a thrust reversing sequence. As noted above and with momentary additional reference to FIG. 1, FIG. 2B shows a normal or cruise mode where fan air is directed through bypass flow path B. When in reverse thrust mode or deployed position, shown in FIG. 2C, bypass flow path B is blocked by one or more circumferentially disposed blocker doors 228, interposed within bypass flow path B and collectively having a complementary geometric configuration with respect thereto, for diversion of fan air into bypass duct 246. The reverse thrust mode is achieved by aftward movement of translating cowl 216, thereby exposing outlet port 274 for airflow to escape through after the air passes into bypass duct 246. Blocker door 228 may comprise a proximal surface, or an aerodynamic surface 229.

Figure 3:
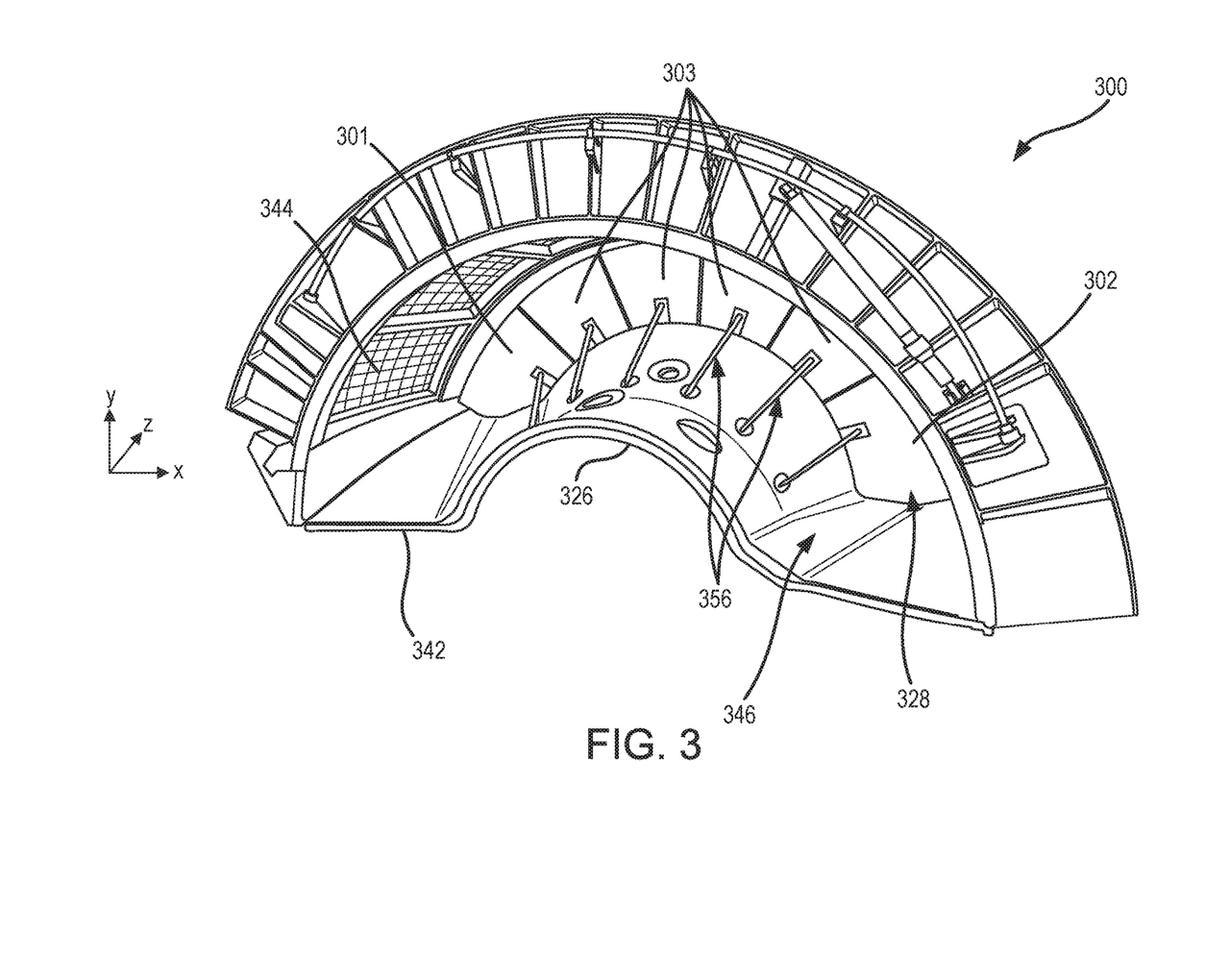
FIG. 3 illustrates a perspective view of a thrust reverser half in a reverse thrust mode, in accordance with various embodiments.

With reference to FIG. 3, a perspective view of the interior of a thrust reverser half 300 is illustrated according to various embodiments. The thrust reverser 300 is shown in the deployed position, with the plurality of blocker doors 328 deployed within the bypass duct 346. As shown, thrust reverser half 300 includes six blocker doors 328 including a first end blocker door 301, a second end blocker door 302 and four center blocker doors 303. Although illustrated as having four center blocker doors 303, thrust reverser 300 may include any number of center blocker doors 303, such as five center blocker doors 303 or six center blocker doors 303, for example. Thrust reverser 300 may comprise drag links 356 extending between IFS 326 and plurality of blocker doors 328. FIG. 3 illustrates cascade 344 located radially outward from plurality of blocker doors 328 and circumferentially surrounding plurality of blocker doors 328. IFS 326 may include a bifurcation panel 342.

With reference to FIG. 4, a blocker door 400 is illustrated, in accordance with various embodiments. Blocker door 400 may comprise a center blocker door, in accordance with various embodiments. Blocker door 400 may comprise a distal surface 402 extending in a lengthwise direction (i.e., the z-direction) between aft edge 404 and forward edge 405 and extending in a widthwise direction (i.e., the x-direction) between a first side edge 406 and a second side edge 407. Blocker door 400 may include a plurality of attachment features. In this regard, blocker door 400 may include first attachment feature 410 and second attachment feature 412. First attachment feature 410 may comprise a lug. Second attachment feature 412 may comprise a lug. Blocker door 400 may be configured to be coupled to a translating sleeve via first attachment feature 410 and second attachment feature 412. Blocker door 400 may comprise a drag link housing 414 extending from distal surface 402. Drag link housing 414 may define an aperture 415 configured to accommodate a drag link. In this regard, blocker door 400 may be configured to be coupled to a drag link via drag link housing 414. In various embodiments, drag link housing 414 may be located substantially midway between first side edge 406 and second side edge 407.

In various embodiments, in response to blocker door 400 being deployed, and due to the three point attachment of blocker door 400 (at drag link housing 414, first attachment feature 410, and second attachment feature 412), blocker door 400 may be subject to a torsional bending mode. For example, blocker door 400 may be subject to torsional twisting along an axis between drag link housing 414 and first attachment feature 410, as well as torsional twisting along an axis between drag link housing 414 and second attachment feature 412. In this regard, a plurality of stiffening features may be provided to prevent blocker door 400 from bending.

In various embodiments, blocker door 400 may include a first diagonal stiffener 420 extending between first attachment feature 410 and drag link housing 414. Blocker door 400 may include a second diagonal stiffener 422 extending between second attachment feature 412 and drag link housing 414. In various embodiments, first diagonal stiffener 420 and second diagonal stiffener 422 may provide load paths between drag link housing 414 and first attachment feature 410 and second attachment feature, respectively. In this regard, first diagonal stiffener 420 may transfer a load between drag link housing 414 and the first attachment feature 410 in response to blocker door 400 being deployed. Furthermore, second diagonal stiffener 422 may transfer the load between drag link housing 414 and second attachment feature 412 in response to blocker door 400 being deployed, In various embodiments, first diagonal stiffener 420 and second diagonal stiffener 422 may extend linearly between drag link housing 414 and first attachment feature 410 and second attachment feature 412, respectively.

In various embodiments, blocker door 400 may include a first perimetrical stiffener 424 extending between first attachment feature 410 and drag link housing 414. First perimetrical stiffener 424 may comprise a bend 425. In this regard, first perimetrical stiffener 424 may generally extend along a perimeter of blocker door 400 to stiffen the area of blocker door 400 in close proximity to the corner between first side edge 406 and aft edge 404. Similarly, blocker door 400 may include a second perimetrical stiffener 426 extending between second attachment feature 412 and drag link housing 414. Second perimetrical stiffener 426 may comprise a bend 427. In this regard, second perimetrical stiffener 426 may generally extend along a perimeter of blocker door 400 to stiffen the area of blocker door 400 in close proximity to the corner between second side edge 407 and aft edge 404. In this regard, first perimetrical stiffener 424 and/or second perimetrical stiffener 426 may comprise a "U" shape, a "V" shape, an "L" shape, or any other suitable shape.

In various embodiments, blocker door 400 may include a first middle stiffener 428 extending between first attachment feature 410 and second attachment feature 412. First middle stiffener 428 may extend linearly between first attachment feature 410 and second attachment feature 412.

In various embodiments, stiffeners 420, 422, 424, 426, and/or 428 may extend from distal surface 402 by a dimension or height 490. In various embodiments, stiffeners 420, 422, 424, 426, and/or 428 may comprise a thickness depicted by arrows 492. The thickness 492 of the stiffeners may vary along a length of each individual stiffener. However, the thickness 492 may be constant along a length of the stiffener, in accordance with various embodiments.

In various embodiments, blocker door 400 may comprise a first platform 430 and a second platform 432. First platform 430 may extend from distal surface 402. First attachment feature 410 may extend from first platform 430. In this regard, first attachment feature 410 may be located over first platform 430. Second platform 432 may extend from distal surface 402. Second attachment feature 412 may extend from second platform 432. In this regard, second attachment feature 412 may be located over second platform 432. First platform 430 and second platform 432 may provide stiffening to blocker door 400 around the region of first attachment feature 410 and second attachment feature 412, respectively.

In various embodiments, blocker door 400 may comprise a first forward stiffener 434 extending in the widthwise direction (i.e., the x-direction) between first side edge 406 and second side edge 407. First forward stiffener 434 may be disposed forward (i.e., in the negative z-direction) of first attachment feature 410 and second attachment feature 412. Blocker door 400 may comprise a second forward stiffener 436 extending in the lengthwise direction (i.e., the z-direction) between forward edge 405 and first attachment feature 410. Blocker door 400 may comprise a third forward stiffener 438 extending in the lengthwise direction between forward edge 405 and second attachment feature 412. Forward stiffeners 434, 436, and 438 may prevent the forward region of blocker door 400 from bending.

In various embodiments, blocker door 400 may include a second middle stiffener 440 extending in the lengthwise direction between first middle stiffener 428 and first forward stiffener 434. In various embodiments, second middle stiffener 440 may be disposed substantially midway between first attachment feature 410 and second attachment feature 412.

In various embodiments, first forward stiffener 434, second forward stiffener 436, third forward stiffener 438, and/or second middle stiffener 440 may extend from distal surface 402 by a dimension, or height, 494. In various embodiments, height 490 may be greater than height 494.

With reference to FIG. 4B, a distal view of blocker door 400 is illustrated, in accordance with various embodiments. In various embodiments, blocker door 400 may comprise a grain direction 480. As used herein, grain direction refers to a rolling process, which stretches the metallurgical structure and inclusions of the material during milling. The grain runs parallel to the rolling direction. In this regard, blocker door 400 may comprise a grain direction 480 in the widthwise direction (i.e., x-direction).

In various embodiments, blocker door 400 may comprise a single unitary member. Stated differently, distal surface 402, first attachment feature 410, second attachment feature 412, drag link housing 414, platforms 430, 432, and stiffeners 420, 422, 424, 426, 428, 434, 436, 438, and 440 may comprise a single unitary member. Blocker door 400 may be formed using subtractive manufacturing methods, such as via a mill for example. Blocker door 400 may be formed using additive manufacturing methods. Stiffeners 420, 422, 424, 426, 428, 434, 436, 438, and 440 may each comprise an elongated boss extending from distal surface 402.

In various embodiments, blocker door 400 may comprise a metal such as a steel alloy, stainless steel, titanium, aluminum, or any other metal. In various embodiments, blocker door, including distal surface 402, first attachment feature 410, second attachment feature 412, drag link housing 414, platforms 430, 432, and stiffeners 420, 422, 424, 426, 428, 434, 436, 438, and 440 may comprise aluminum.

Various geometries of blocker door 400 may vary. For example, the geometry of a center blocker door (see blocker doors 303 of FIG. 3) may vary from the geometry of side blocker doors (see blocker doors 301, 302 of FIG. 3). In this regard, FIG. 5 illustrates a side blocker door, in accordance with various embodiments.

Figure 5:
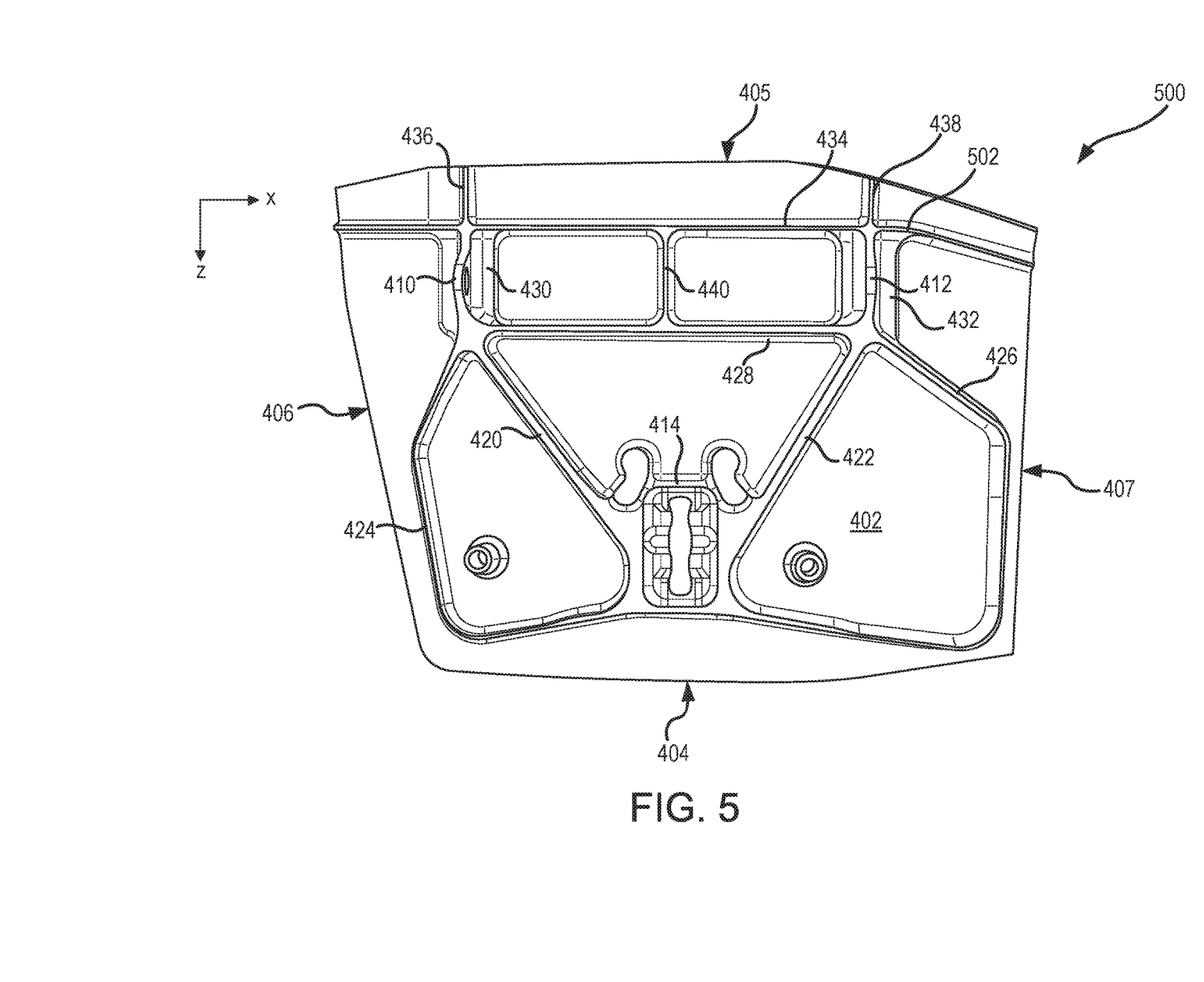
FIG. 5 illustrates a distal view of a thrust reverser blocker door having stiffening features, in accordance with various embodiments.

With respect to FIG. 5, elements with like element numbering, as depicted in FIGS. 4A and 4B, are intended to be functionally and/or geometrically similar and will not necessarily be repeated for the sake of clarity.

With reference to FIG. 5, a blocker door 500 is illustrated, in accordance with various embodiments. Blocker door 500 may comprise a side blocker door. In this regard, second side edge 407 may be configured to be located adjacent to an IFS and first side edge 406 may be configured to conform to an adjacent blocker door. First side edge 406 may be non-linear. Second side edge 407 may be linear. In this regard, second perimetrical stiffener 426 may comprise a length which is greater than the length of first perimetrical stiffener 424 to provide stiffening near second side edge 407. Furthermore, first forward stiffener may comprise a bend 502 to conform to the geometry of forward edge 405.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser blocker door comprising:
   a proximal surface extending in a lengthwise direction between a forward edge and an aft edge and extending in a widthwise direction between a first side edge and a second side edge;
   a distal surface located opposite the proximal surface and extending between the forward edge and the aft edge and extending between the first side edge and the second side edge;
   a first attachment feature extending from the distal surface;
   a second attachment feature extending from the distal surface;
   a drag link housing extending from the distal surface;
   a first diagonal stiffener extending from the distal surface and extending between the first attachment feature and the drag link housing;
   a second diagonal stiffener extending from the distal surface and extending between the second attachment feature and the drag link housing;
   a first perimetrical stiffener extending from the distal surface and extending from the first attachment feature and the drag link housing; and
   a second perimetrical stiffener extending from the distal surface and extending from the second attachment feature and the drag link housing;
   a first forward stiffener extending in the lengthwise direction from the first attachment feature to the forward edge; and
   a second forward stiffener extending in the lengthwise direction from the second attachment feature to the forward edge.

2. The thrust reverser blocker door of claim 1, further comprising: a first middle stiffener extending in the widthwise direction between the first attachment feature and the second attachment feature; and
   a third forward stiffener disposed forward of the first attachment feature and the second attachment feature and extending in the widthwise direction between the first side edge and the second side edge.

3. The thrust reverser blocker door of claim 2, further comprising:
   a first platform extending from the distal surface, the first attachment feature extending from the first platform; and
   a second platform extending from the distal surface, the second attachment feature extending from the second platform.

4. The thrust reverser blocker door of claim 3, wherein the first diagonal stiffener transfers a load between the drag link housing and the first attachment feature in response to the thrust reverser blocker door being deployed and the second diagonal stiffener transfers the load between the drag link housing and the second attachment feature in response to the thrust reverser blocker door being deployed.

5. The thrust reverser blocker door of claim 4, wherein the thrust reverser blocker door, the first diagonal stiffener, the second diagonal stiffener, the first perimetrical stiffener, the second perimetrical stiffener, the first middle stiffener, the drag link housing, the first attachment feature and the second attachment feature comprise a single unitary member.

6. The thrust reverser blocker door of claim 5, wherein at least one of the first diagonal stiffener, the second diagonal stiffener, the first perimetrical stiffener, the second perimetrical stiffener, and the first middle stiffener comprise an elongated boss extending from the distal surface.

7. The thrust reverser blocker door of claim 6, wherein the thrust reverser blocker door, the first diagonal stiffener, the second diagonal stiffener, the first perimetrical stiffener, the second perimetrical stiffener, the first middle stiffener, the drag link housing, the first attachment feature and the second attachment feature comprise aluminum.

8. The thrust reverser blocker door of claim 7, wherein a grain direction of the thrust reverser blocker door is in the widthwise direction.

9. The thrust reverser blocker door of claim 3, further comprising a second middle stiffener extending in the lengthwise direction between the third forward stiffener and the first middle stiffener.

10. A thrust reverser comprising:
    inner fixed structure (IFS);
    a cascade disposed radially outward from the IFS;
    a plurality of blocker doors disposed between the IFS and the cascade; and
    a plurality of drag links coupled between the plurality of blocker doors and the IFS, wherein the plurality of blocker doors includes at least a first blocker door and a second blocker door, the first blocker door comprises:
    a proximal surface extending in a lengthwise direction between a forward edge and an aft edge and extending in a widthwise direction between a first side edge and a second side edge;
    a distal surface located opposite the proximal surface and extending between the forward edge and the aft edge and extending between the first side edge and the second side edge;
    a first attachment feature extending from the distal surface;
    a second attachment feature extending from the distal surface;
    a drag link housing extending from the distal surface;

a first diagonal stiffener extending from the distal surface and extending between the first attachment feature and the drag link housing;

a second diagonal stiffener extending from the distal surface and extending between the second attachment feature and the drag link housing;

a first perimetrical stiffener extending from the distal surface and extending from the first attachment feature and the drag link housing; and a second perimetrical stiffener extending from the distal surface and extending from the second attachment feature and the drag link housing;

a first forward stiffener extending in the lengthwise direction from the first attachment feature to the forward edge; and a second forward stiffener extending in the lengthwise direction from the second attachment feature to the forward edge.

11. The thrust reverser of claim 10, wherein the first blocker door further comprises:

a first middle stiffener extending in the widthwise direction between the first attachment feature and the second attachment feature; and a third forward stiffener disposed forward of the first attachment feature and the second attachment feature and extending in the widthwise direction between the first side edge and the second side edge.

12. The thrust reverser of claim 11, wherein the first blocker door further comprises: a first platform extending from the distal surface, the first attachment feature extending from the first platform; and a second platform extending from the distal surface, the second attachment feature extending from the second platform.

13. The thrust reverser of claim 12, wherein the first diagonal stiffener transfers a load between the drag link housing and the first attachment feature in response to the first blocker door being deployed and the second diagonal stiffener transfers the load between the drag link housing and the second attachment feature in response to the first blocker door being deployed.

14. The thrust reverser of claim 13, wherein the first blocker door, the first diagonal stiffener, the second diagonal stiffener, the first perimetrical stiffener, the second perimetrical stiffener, the first middle stiffener, the drag link housing, the first attachment feature and the second attachment feature comprise a single unitary member.

15. The thrust reverser of claim 11, further comprising a second middle stiffener extending in the lengthwise direction between the third forward stiffener and the first middle stiffener.

* * * * *